Figure 28:
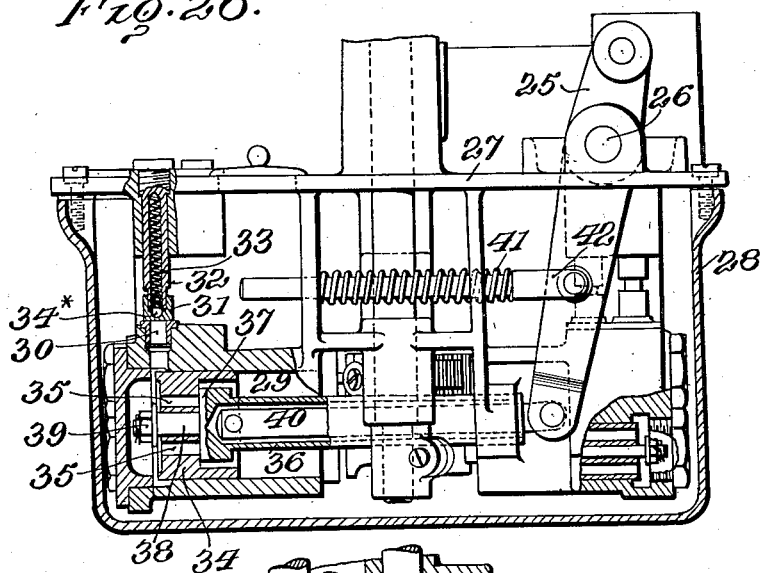

J. S. BANCROFT & M. C. INDAHL.
DRIVING OR TRANSMISSION MECHANISM FOR TYPE AND OTHER MACHINES.
APPLICATION FILED APR. 28, 1910.
1,094,623.
Patented Apr. 28, 1914.
11 SHEETS—SHEET 1.
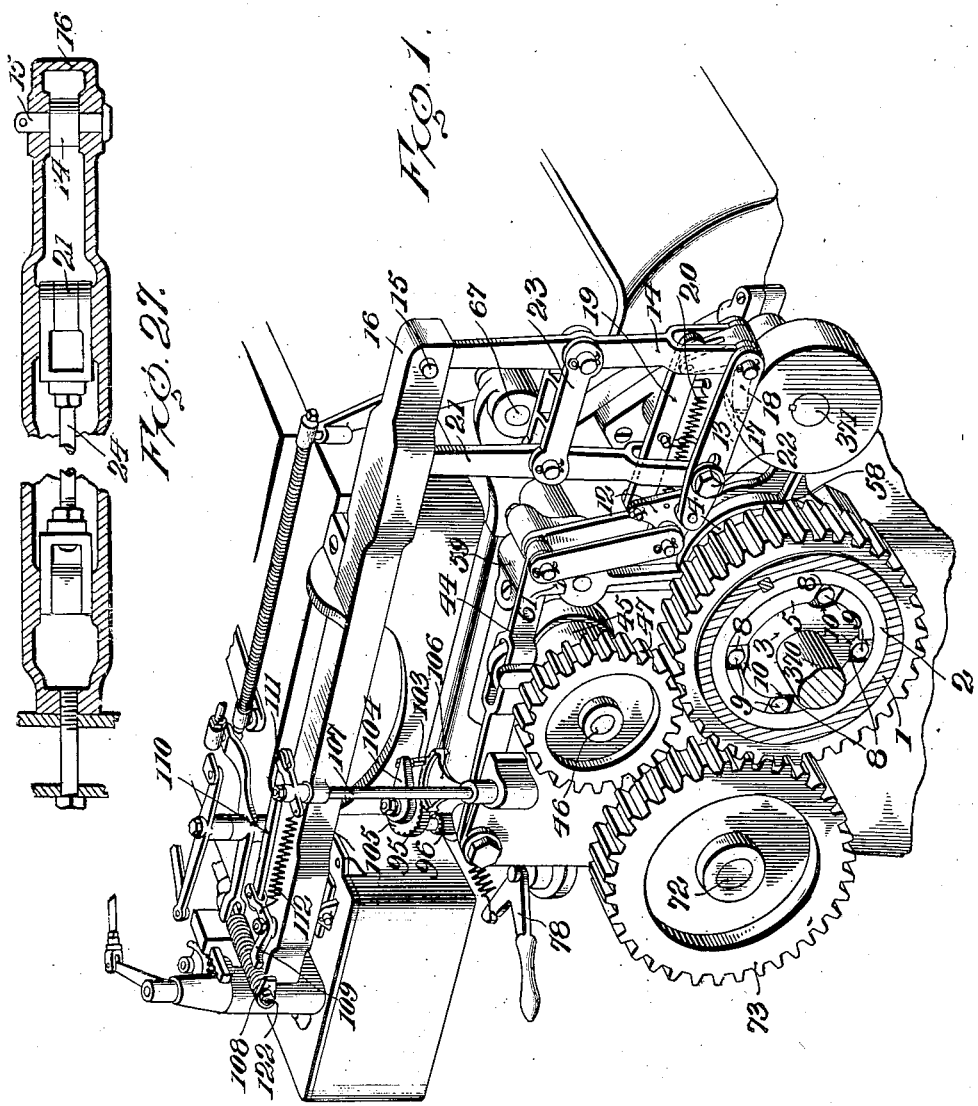

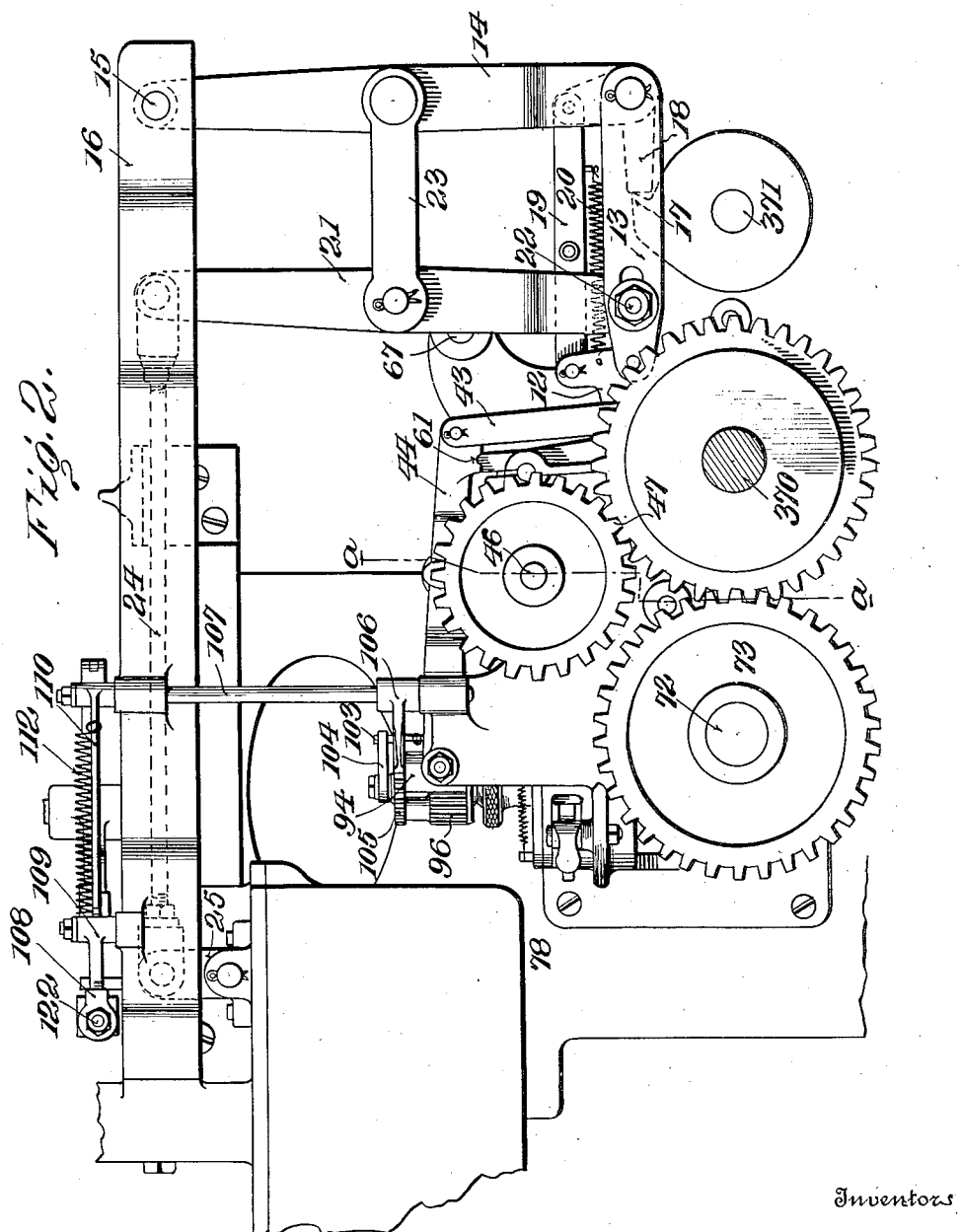

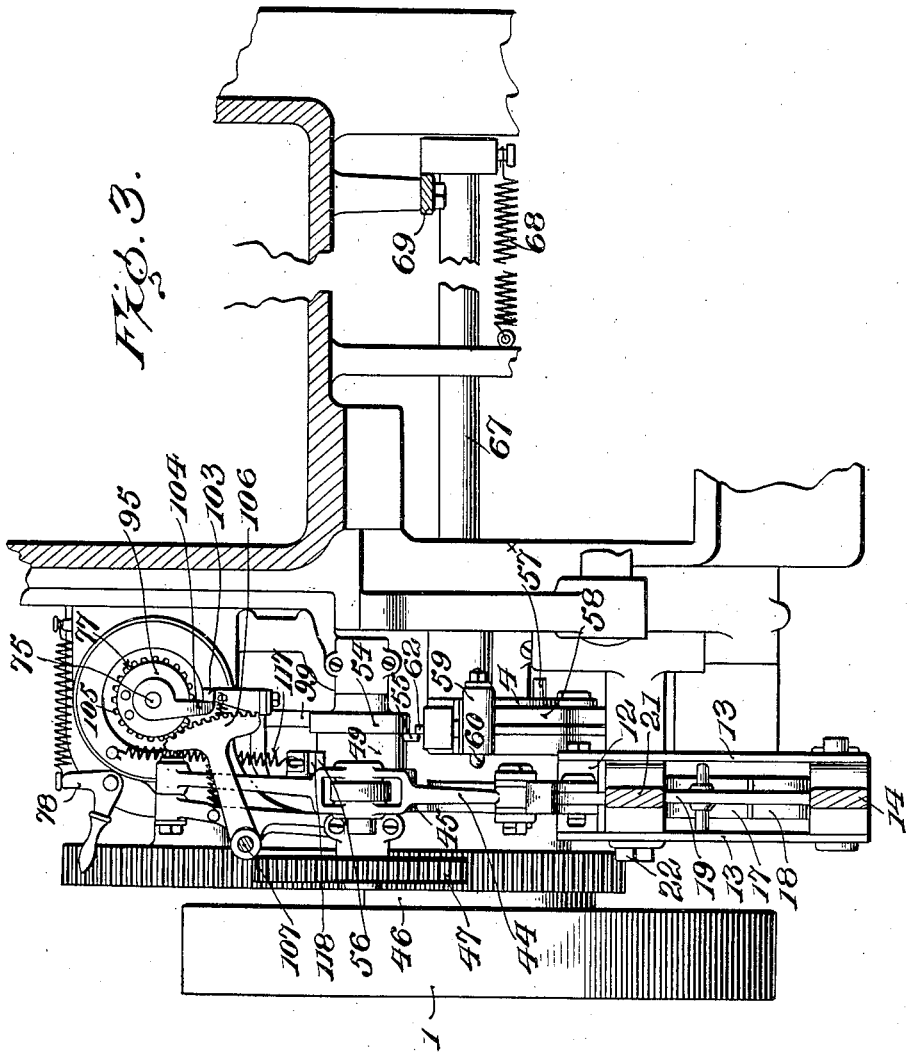

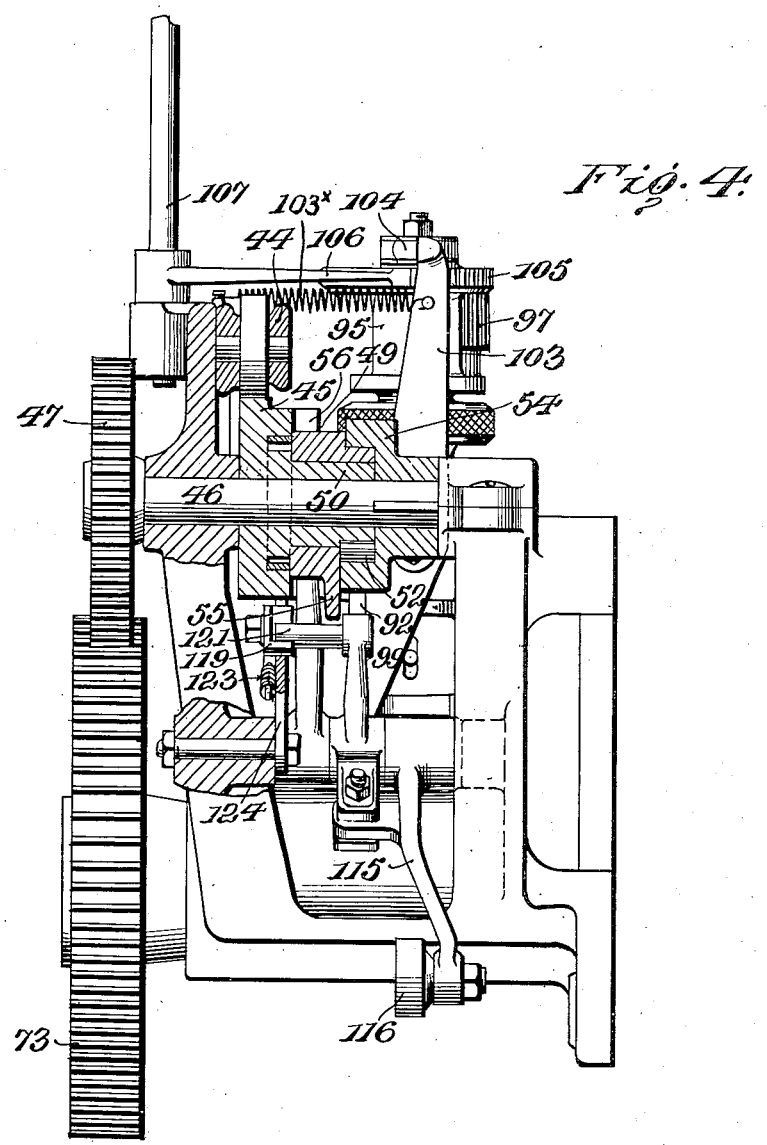

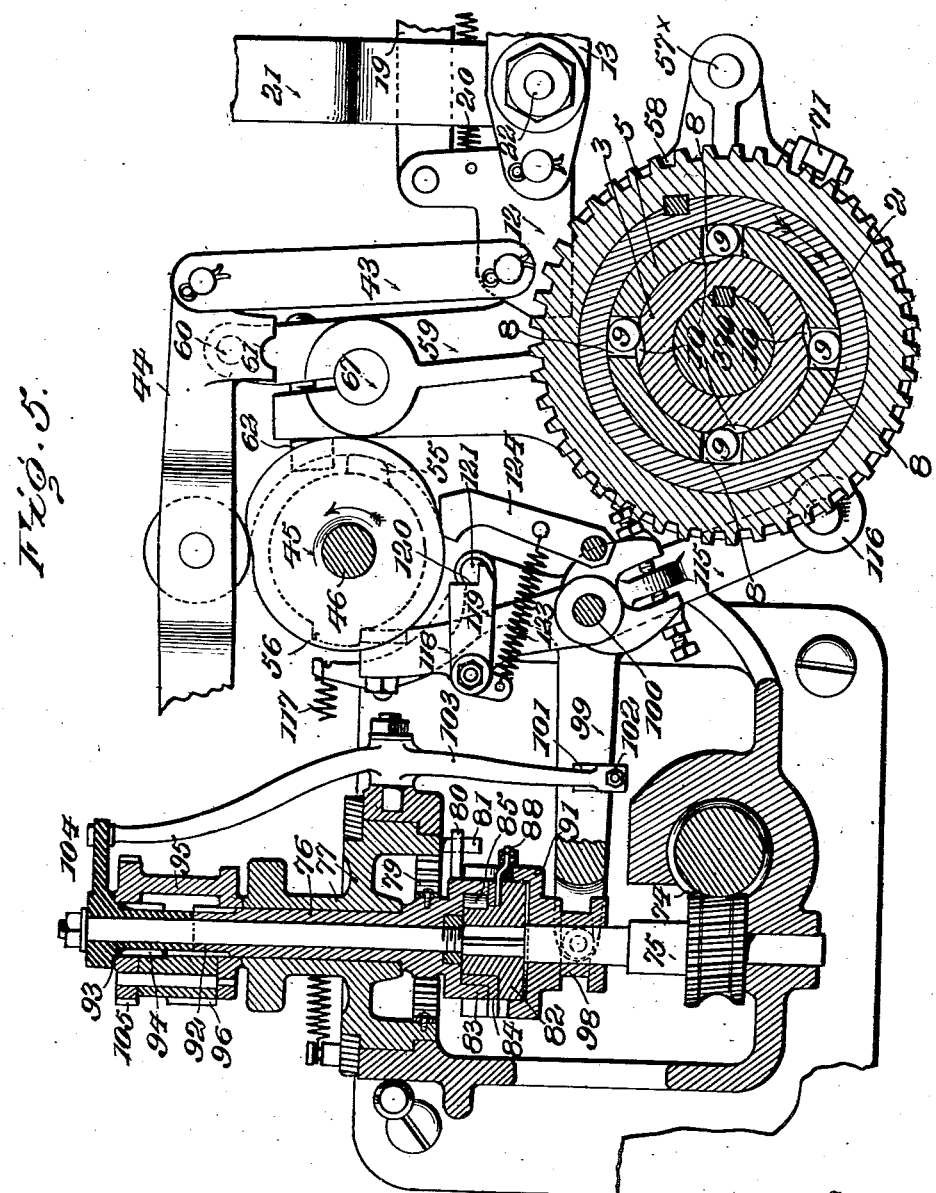

J. S. BANCROFT & M. C. INDAHL.
DRIVING OR TRANSMISSION MECHANISM FOR TYPE AND OTHER MACHINES.
APPLICATION FILED APR. 28, 1910.
1,094,623.
Patented Apr. 28, 1914.
11 SHEETS—SHEET 6.
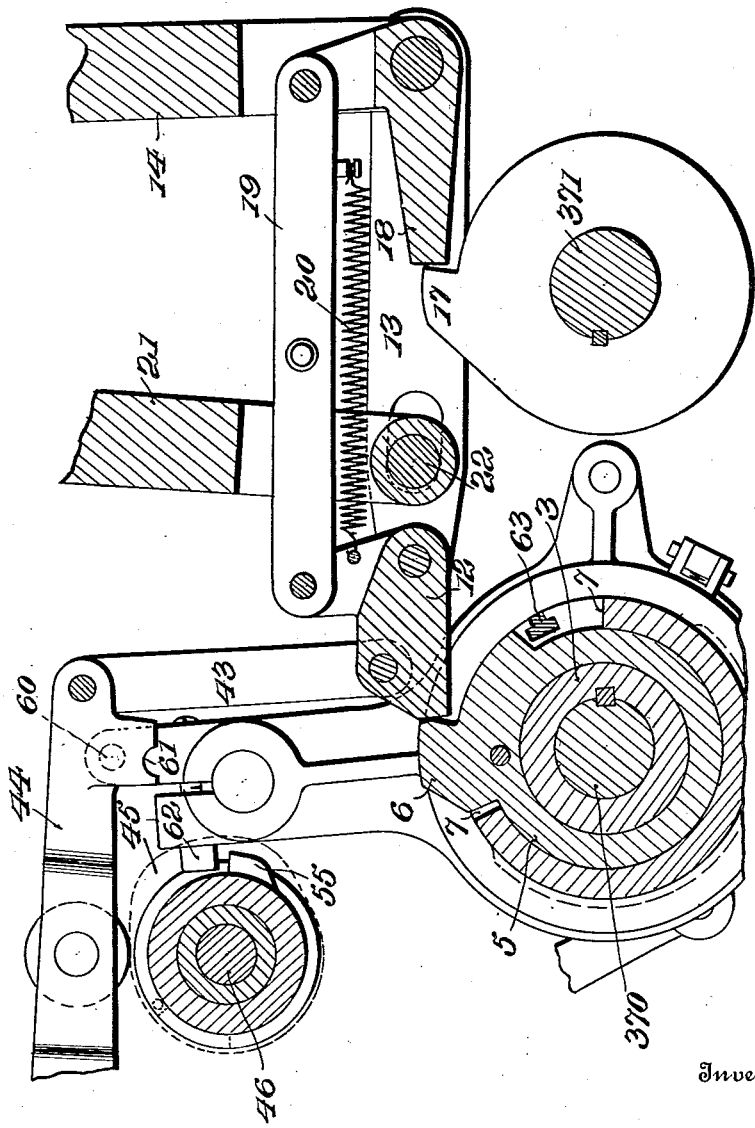

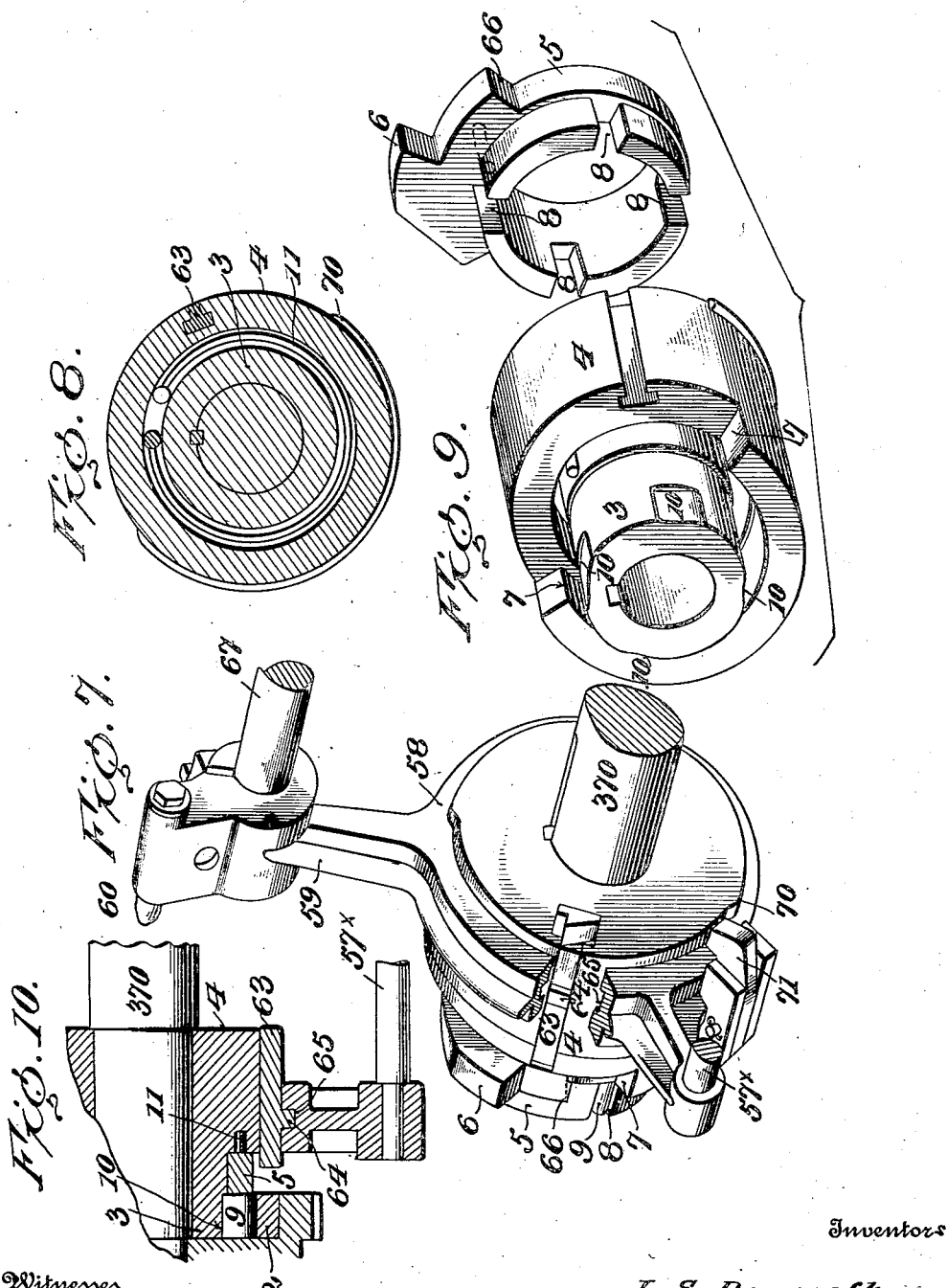

J. S. BANCROFT & M. C. INDAHL.
DRIVING OR TRANSMISSION MECHANISM FOR TYPE AND OTHER MACHINES.
APPLICATION FILED APR. 28, 1910.
1,094,623.
Patented Apr. 28, 1914
11 SHEETS—SHEET 8.
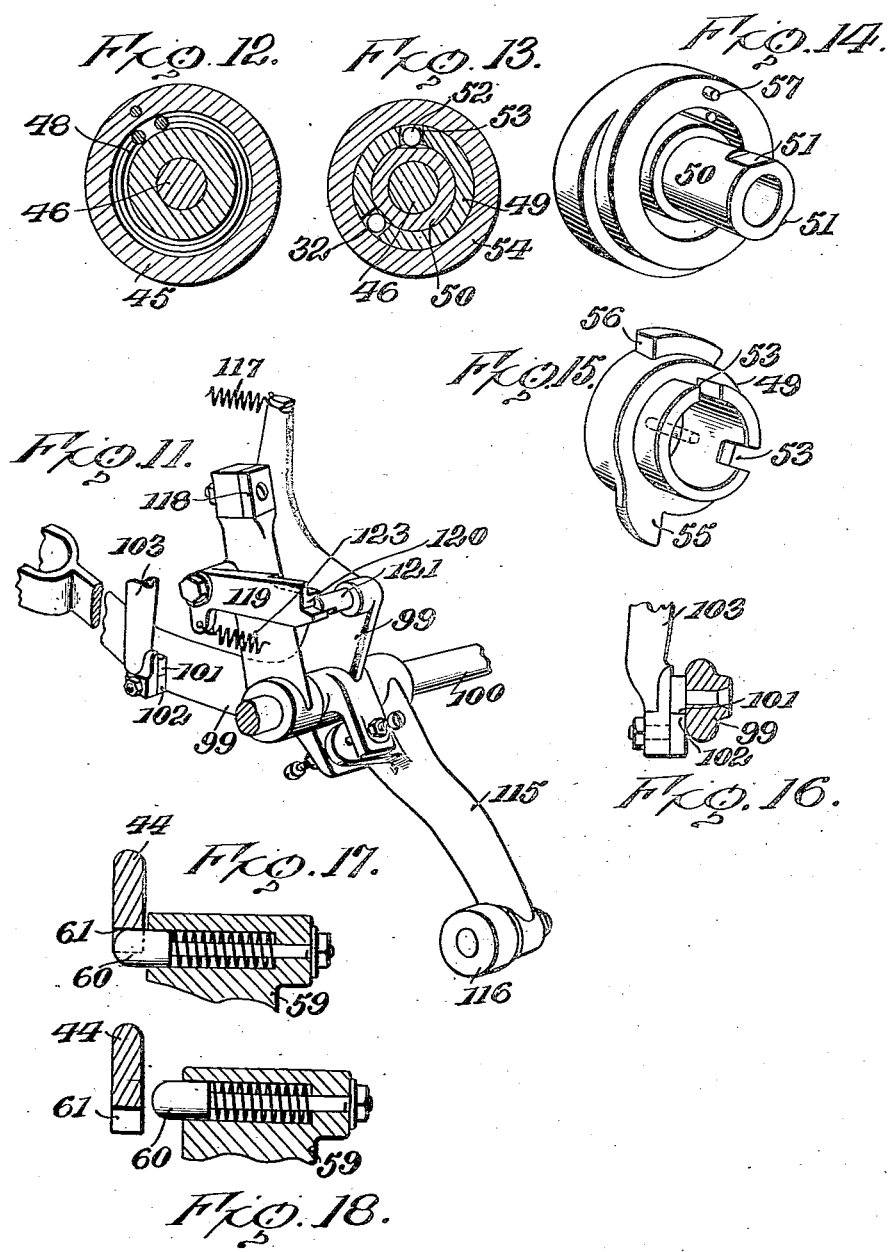

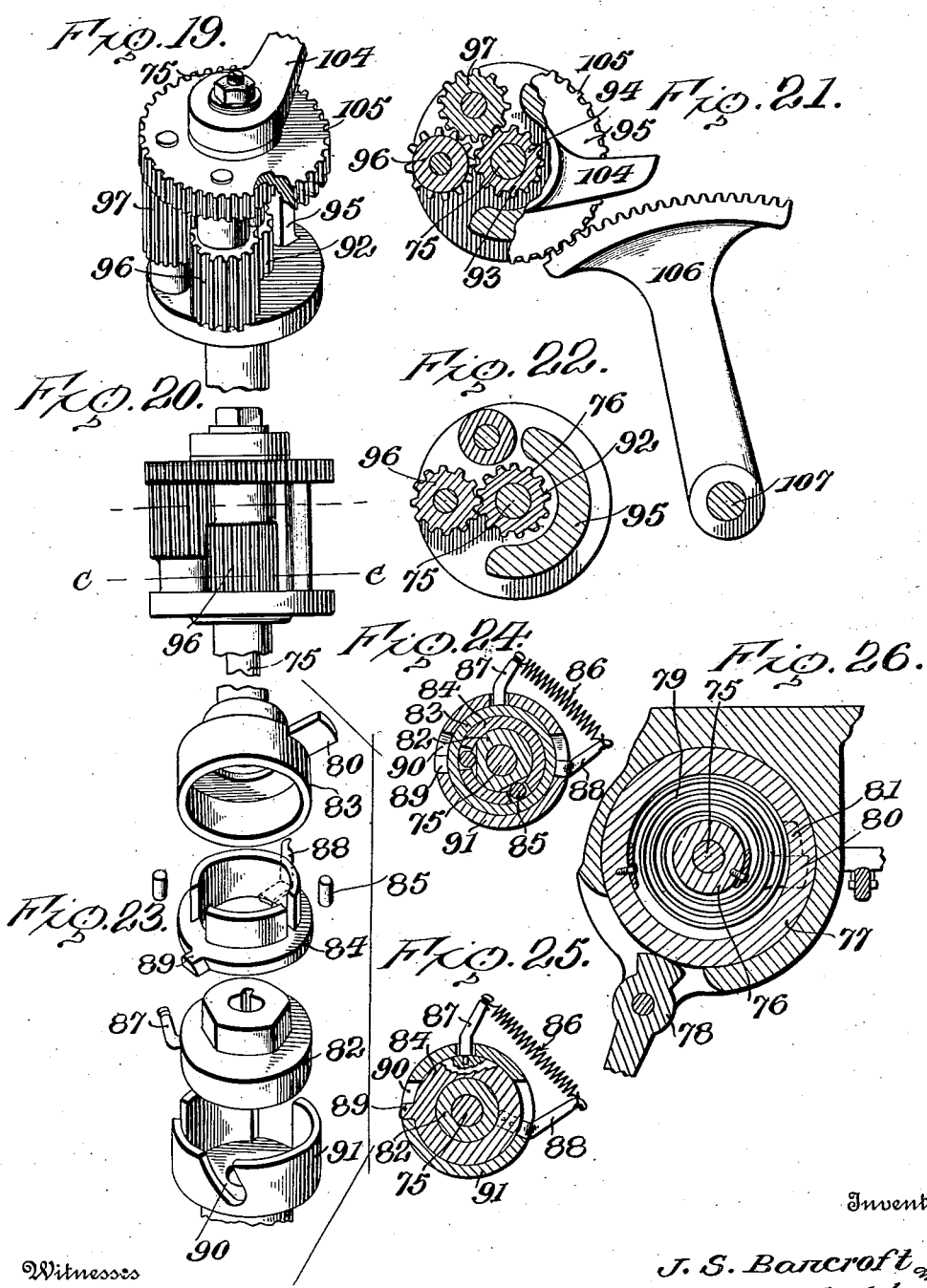

J. S. BANCROFT & M. C. INDAHL.
DRIVING OR TRANSMISSION MECHANISM FOR TYPE AND OTHER MACHINES.
APPLICATION FILED APR. 28, 1910.

1,094,623.

Patented Apr. 28, 1914.
11 SHEETS—SHEET 10.

Witnesses
W. A. Williams
Thomas Durant

Inventors
J. S. Bancroft and
M. C. Indahl.
By Church & Church
their Attorneys

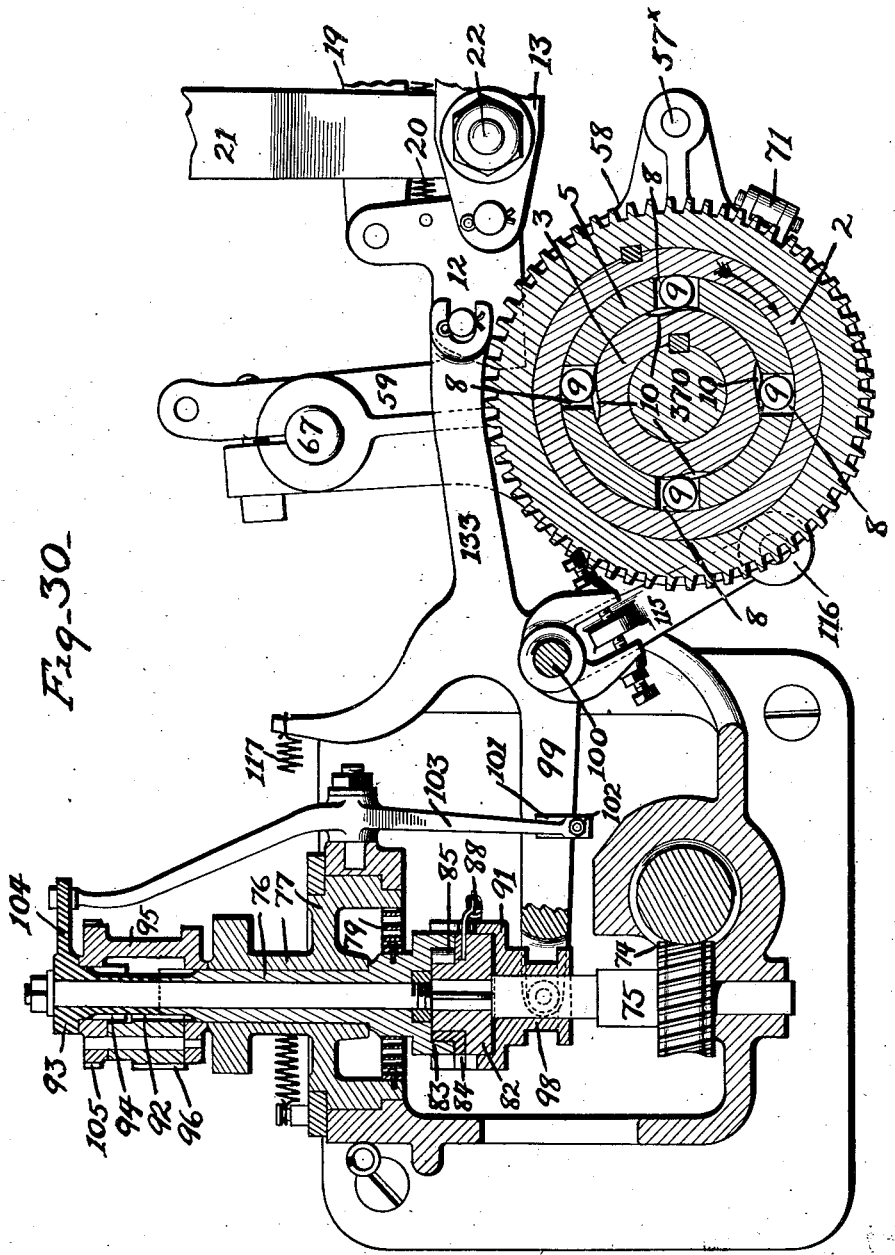

UNITED STATES PATENT OFFICE.

JOHN SELLERS BANCROFT AND MAURITZ C. INDAHL, OF PHILADELPHIA, PENNSYLVANIA, ASSIGNORS TO LANSTON MONOTYPE MACHINE COMPANY, OF PHILADELPHIA, PENNSYLVANIA, A CORPORATION OF VIRGINIA.

DRIVING OR TRANSMISSION MECHANISM FOR TYPE AND OTHER MACHINES.

1,094,623.  Specification of Letters Patent.  Patented Apr. 28, 1914.

Original application filed January 4, 1909, Serial No. 470,576. Divided and this application filed April 28, 1910. Serial No. 558,146.

*To all whom it may concern:*

Be it known that we, JOHN SELLERS BANCROFT and MAURITZ C. INDAHL, both residing at Philadelphia, in the county of Philadelphia and State of Pennsylvania, have invented a certain new and useful Improvement in Driving or Transmission Mechanism for Type and other Machines; and we do hereby declare the following to be a full, clear, and exact description of the same, reference being had to the accompanying drawings, forming a part of this specification, and to the figures and letters of reference marked thereon.

This invention relates generically to power transmitting mechanism and specifically to the driving mechanism of type and similar casting machines wherein it is desired to produce a dwell in the motion of the mechanism sufficient to permit the setting of the metal before its discharge from the mold and it has for its principal object to provide a means whereby said dwell can be varied in extent or duration to suit existing conditions.

To this end the invention consists broadly (1) in equipping a driving or transmission mechanism containing driving and driven members and intermediate coupling means, such as a clutch, with controllable means adapted to govern said coupling means and vary the open period; and (2) in providing said coupling means with an adjustable timing mechanism whereby the dwell or period of rest between successive revolutions of the driven member can be adjusted or varied.

In addition, the invention includes minor features relating to the construction, combination and arrangement of parts hereinafter described and pointed out in the appended claims.

Figure 29:
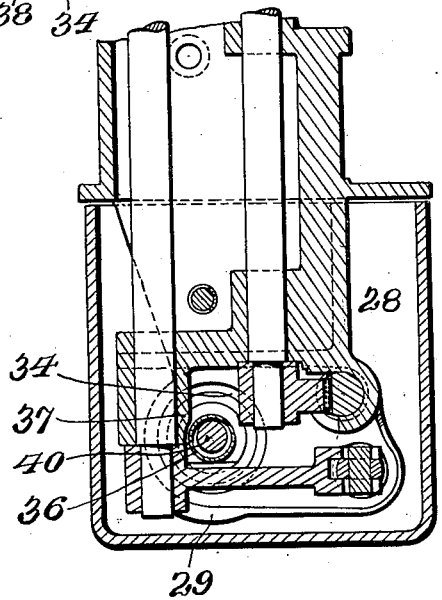

In the accompanying drawings illustrating a preferred form of embodiment of said invention Figure 1 is a view in perspective of a portion of a type casting machine of known construction with the improved driving mechanism applied thereto. Fig. 2 is a front elevation, and Fig. 3 is a top plan view of the driving mechanism complete. Fig. 4 is a vertical section on the line *a—a*, Fig. 2. Fig. 5 is a vertical sectional view of the timing mechanism and primary clutch with some of the intermediate devices in elevation. Fig. 6 is a sectional view through the primary clutch and a portion of the braking or cushioning mechanism together with the stop device and controlling devices connected therewith. Fig. 7 is a perspective view of the driving member of the primary clutch and the clutch opening collar. Fig. 8 is a sectional view of the driven member of the primary clutch. Fig. 9 is a perspective view showing the hub and the actuating collar or ring of the primary clutch detached and separated. Fig. 10 is a sectional view of a portion of the primary clutch. Fig. 11 is a perspective view of the controlling lever of the timing mechanism and its connections. Figs. 12 to 15, inclusive, are details of the secondary clutch. Fig. 16 is a detail view of the timing lever latching device. Figs. 17 and 18 are detail views showing the spring pin carried by the clutch actuating collar in different relations with the shifting lever of the stop for the primary clutch. Fig. 19 is a perspective view and Fig. 20 is a side elevation of the epicyclic train of gears forming part of the timing mechanism together with the admeasuring arm. Fig. 21 is a partial transverse sectional view of the epicyclic train showing means for shifting the gear head or casing. Fig. 22 is a sectional view on the line *c—c*, Fig. 20. Figs. 23 to 25, inclusive, are detail views of the clutch for the timing mechanism. Fig. 26 is a sectional view showing means for adjusting the back stop for the admeasuring arm of the timing mechanism. Fig. 27 is a detail view of the adjustable connection for the braking or cushioning devices. Figs. 28 and 29 are sectional views partly in elevation and in planes at right angles illustrating details of the hydraulic check. Fig. 30 is a sectional view illustrating a modified form of connection between the timing mechanism and the primary clutch.

Like letters of reference in the several figures indicate the same parts.

For purposes of illustration, the invention is shown in a form specially designed and adapted for use in connection with the type casting and composing machine of Patent No. 625,998, dated May 30, 1899, whereof is shown a portion of the frame together with cam shafts 370, 371, and mold-blade actuating rod 122, it being understood, however, that the invention is not limited in this respect, but, on the contrary, is applicable to any machine and in any situation where a dwell in the motion of a driven member is desired.

It will suffice for present purposes to state that in the machine of the patent 370 is the main driving shaft or member through which the motor is coupled to and actuates the machine, and 371 is a second cam shaft geared to rotate in unison with and in the opposite direction to main cam shaft 370; that rod 122 is so connected with the mold dimensioning devices that its longitudinal position is varied to correspond with the set-wise dimensions of the mold at the time the cast is made; and that means (such as a hand wheel and connections) are provided whereby the cam shafts and connected mechanisms may be turned in either direction when the motor devices are disconnected.

In the present instance the motor driving mechanism is represented by a pulley 1 supported to revolve independently as upon shaft 370, and coupled with the latter through the medium of a clutch, the latter preferably of the one revolution automatic closing or engaging type illustrated. wherein the driving pulley 1, hereinafter referred to as the "driving member" is provided with an annular bearing or sleeve 2, surrounding the hub 3 of a cylindrical head 4, the latter fixed to the shaft 370, hereinafter referred to as the "driven member." Mounted to turn freely upon hub 3 is a sleeve 5, provided with a radial arm or off-set portion 6, movable between shoulders 7 on head 4 and slotted at 8 for the reception of rollers 9, the latter being received in the space between bearing surface 2 and cam seats 10 on the hub 3. A spring 11 (Figs. 8 and 10) attached at one end to sleeve 5 and at the other to head 4 operates to turn said sleeve in a direction to carry the rollers 9 toward the more prominent portions of their seats 10, causing them to be gripped between said seats and the exterior surface of bearing or sleeve 2, and when said sleeve 5 strikes an obstruction, or is otherwise turned back on hub 3, rollers 9 are shifted onto the lower portions of cam seats 10, the clutch is opened and the driving and driven members are free to rotate independently.

The disengagement of the driving and driven members at a predetermined point in the revolution of the latter is effected, in this instance, by the interposition of a stop 12 in the path of arm 6, said stop operating to arrest sleeve 5, thereby shifting the clutching rollers opposite the depressed portions of seats 10, and permitting the driving member to rotate without communicating its motion to the driven member. The clutch represented is of the well-known one revolution type, the stop 12, after its withdrawal, to effect the closing of the clutch, being returned into the path of arm 6 to intercept the latter and open the clutch at the end of each revolution of the driven member. The unclutching movement of sleeve 5 relative to hub 3 might be limited by the engagement of arm 6 with the rear shoulder 7 of head 4, in which event stop 12 would sustain the impact of the driven mechanism in arresting the latter at the time of unclutching. At slow speeds and with light mechanism this might possibly be successfully performed, but where considerable momentum is developed, as in the type machine to which reference has been made, and it is desired to stop the driven mechanism quickly, it would be dangerous to depend upon the clutch shifting stop alone to bring the driven mechanism promptly to rest, hence it is desirable, if not positively necessary, that additional braking or cushioning devices should be added. Such a braking mechanism has been devised and is illustrated herein. The unclutching member or stop 12 is pivotally supported upon one end of a pair of links 13, the opposite end whereof is pivoted to a lever 14 suspended from a pivot 15 in an extension 16 of the frame. To the cam shaft 371 (coupled to rotate in unison with and in the same direction as cam shaft 370) is secured an arm or abutment 17, in position to engage a latch 18, the latter pivotally supported on links 13 and coupled with stop 12 by a link 19 in such manner that said stop and latch will be oscillated in unison upon their pivots, to simultaneously withdraw or interpose their operating members in the paths of their respective arms 6 and 17. A spring 20 connected at one end to stop 12 and at the other to link 19 tends to hold both stop 12 and latch 18 in operating position and permits them to be withdrawn therefrom by operating devices connected with stop 12, as will presently appear.

A lever 21, pivotally supported at its lower end upon a fixed stud 22 on the frame is coupled at an intermediate point in its length to lever 14, as by a link 23, and the upper or free end of said lever 21 is coupled, through an adjustable link 24, with a lever 25 whose pivot 26 is mounted in bearings on the removable top plate or cover 27 of a receptacle 28 into which latter said lever 25 projects. Conveniently, the receptacle 28 is that containing the retarding pistons for the die-case controlling mechanism of patent No. 924,957 dated June 15, 1909, portions of which are illustrated in Figs. 28 and 29, but inasmuch as this die case controlling mechanism forms no part of the present invention a description thereof is unnecessary.

Within receptacle 28 is formed or secured a cylinder 29 closed at one end and provided with a discharge orifice 30, controlled by a loaded escape valve 31, the latter guided upon an adjustable support 32 containing an adjustable seating spring 33 engaging a spherical bearing block $34^x$ on the valve. A piston 34 working within cylinder 29 and provided with longitudinal ports 35 is connected to a piston rod 36, the latter provided with a valve 37 and a pin 38 passing through the piston and carrying a nut or collar 39. The interval between nut 39 and valve 37 is slightly greater than the thickness of the piston at the points of contact therewith, the arrangement being such that when the piston rod is advanced toward the closed end of the cylinder, valve 37 will cover and close ports 35, to prevent the escape of the liquid therethrough and compel it to pass through discharge orifice 30 against the resistance of valve 31; but when the motion of the piston rod is reversed, valve 37 will be withdrawn from the piston, permitting a free entrance of liquid into the cylinder. The hydraulic check as thus constituted is coupled with lever 25 through a link 40, and a spring 41, acting through a rod 42 pivotally connected to lever 25, serves to retract the piston, the cylinder, which is submerged in the liquid contained within the casing, filling through ports 35.

The office of the hydraulic check as here applied is to absorb the momentum of the driven mechanism immediately the clutch is released or opened, and, incidentally, to cushion the blow of the clutch operating arm 6, to which end the parts are so arranged and adjusted that stop 12 will engage said arm and open the clutch immediately before latch 18 engages its arm 17 so that the driven member will be brought to rest immediately the unclutching is accomplished. This result is secured by mounting the stop and latch on links 13 coupled with lever 14 through which their motion is transmitted to piston 34. As is obvious, other forms of cushioning or braking devices might be employed for the purpose, those described being specially adapted for use in connection with the particular form of machine illustrated. The connection between the driving and driven members having been interrupted in the manner described it can be instantly reëstablished by the withdrawal of stop 12 from in front of arm 6, whereupon spring 11 will advance sleeve 5 to press the rollers into contact with annular bearing surface 2.

Having now explained a competent means for effecting the engagement and disengagement of the driving and driven members it is next in order to describe the principal novel features of the present invention, to-wit, a means for automatically effecting the engagement of the driving and driven members and controlling the duration of the dwell or interval of rest of the driven member, the driving member continuing in motion.

In the preferred form of embodiment illustrated it will be seen that stop 12 is connected by link 43 to a lever 44, the latter carrying a roller engaging a cam 45 loose on a shaft 46. This shaft is coupled through gear 47 on said shaft and intermeshing gear $47^x$ on sleeve 2, with the driving member, i. e., pulley 1, and rotates in unison with the latter at a speed determined by the relative size of the transmission wheels, in the present instance somewhat in excess of the speed of the driving member. Cam 45 is so shaped that during each revolution and at a predetermined point therein it will operate to withdraw stop 12 and latch 18 and retain them in retracted position during the passage of arms 6 and 17, and subsequently thereto will advance said stop and latch into operating position to again engage arms 6 and 17 provided the latter intersect the paths of said catch and latch before the latter are again withdrawn by cam 45. This is a feature of collateral importance, as will presently appear.

Between the clutch operating cam 45 and its driving shaft 46 is interposed a clutch similar, in this example, to the primary clutch connecting the main driving and driven members and which may be designated as the secondary clutch. The details of this clutch are illustrated in Figs. 12 to 15, inclusive. Cam 45 constituting the driven member of this device is recessed for the reception of a spring 48 one end whereof engages a sleeve 49 turning on the hub 50, the latter provided with cam seats 51 for the clutch rollers 52. These rollers lie in recesses 53 in sleeve 49 between hub 50 and an annular bearing or sleeve 54 fast on shaft 46 and constituting the driving member of this clutch.

The clutch operating sleeve 49 is provided with two arms or off-sets 55, 56, in different planes, either of which when engaged by a suitable stop will serve to arrest the sleeve 49 and shift the clutching rollers, to release the cam from its driving shaft, a pin 57 on cam 45 operating in connection with one of said arms (56) serving to limit the throw of the sleeve in unclutching. As the principal object in introducing this secondary clutch and connecting the timing mechanism therewith, rather than to the primary clutch (as indicated by the dotted lines in Fig. 5) is to enable the driven mechanism to be turned by hand in either direction when the stopping lever or handle of the machine is manipulated to disconnect the driving member, it is convenient at this point to explain this collateral feature of the invention.

Surrounding head 4 of the primary clutch and guided upon a rod 57× is a collar 58 provided with an arm 59 carrying a spring projected pin 60 in position to engage the side of lever 44 when the latter is in its lower position, and to enter beneath a bearing 61 and thus sustain said lever when the latter is elevated to withdraw stop 12 from the path of arm 6. Arm 59 is also provided with a projection or bearing 62 lying normally to one side of the plane of movement of the disengaging arm 55 of the secondary clutch, but adapted to be held in said path when the advance of collar 58 is arrested at an intermediate station as will presently appear. The driven member or head 4 of the primary clutch is furnished with a longitudinal guide for a bolt 63, the latter provided with an offset 64 riding in a groove 65 in collar 58 so that said bolt will partake of the movement of the collar in a direction longitudinally of shaft 370. Bolt 63 is so located with relation to a shoulder 66 on arm 6 that when the latter is arrested or retracted, to unclutch the driven from the driving member, it can pass said shoulder and thus lock arm 6 in retracted position; but when said arm 6 is forward in running position the advance of bolt 63 will be prevented until said drum is again thrown back to unclutched position. It is when collar 58 is thus arrested by the engagement of bolt 63 with arm 6 that bearing 62 stands in the path of arm 55.

Coupled with collar 58 is the unclutching shaft or rod 67 of the driven machine, provided with a spring 68 for moving it to unclutching position and restrained and returned by a lever 69 coupled with what was previously known as the belt shifting lever of the type machine. The release of said belt shifting lever permits collar 58 to advance under pressure of spring 68. If, at the time, lever 44 is down and stop 12 is engaging arm 6, to open the primary clutch, as represented in Figs. 5 and 6, bolt 63 will pass in front of shoulder 66, to lock the clutch open, projection or bearing 62 will cross the path of disengaging arm 55 of the secondary clutch, and pin 60 will be retracted by contact with lever 44. Cam 45 continuing in motion raises lever 44 and with it stop 12 and catch 18 until pin 60 is released when it engages bearing 61 to sustain lever 44. Should the advance of collar 58 take place when the primary clutch was closed, that is to say, with sleeve 5 in its advanced or clutching position and lever 44 either elevated or depressed, bolt 63 will be prevented from passing arm 6, and by its engagement with the side thereof will arrest collar 58 until after the primary clutch is again opened, when the action first described will be repeated. By these means not only is the primary clutch opened and locked in that position, but the stop 12 and latch 18 which would prevent free rotation of the driven mechanism are withdrawn leaving said mechanism entirely free of the driving member or mechanism.

To start up again it is only necessary to retract collar 58 to initial position, thereby withdrawing locking bolt 63 and pin 60 to release the primary clutch and its actuating lever 44. For certain reasons pertaining to the structure of the type machine of the patent referred to it is desirable that the starting of the mechanism should take place only within a certain limited portion of the revolution of the cam shaft 370. To secure this result, head 4 is provided at one end with a circumferential flange or shoulder 70 coextensive with the inhibited section i. e. that portion of the revolution of shaft 370 in which the starting up is to be prevented and the collar 58 carries a spring actuated interlocking pawl 71, adapted to hook over and engage said flange and prevent the clutch closing movement of collar 58 becoming effective until the flange has passed beyond said pawl 71. If, in turning over the mechanism, the driven member is left with pawl 71 behind flange 70, collar 58 may not be shifted to couple up the driving member, until the driven member is readjusted to bring the gap in said flange in register with the pawl, the latter constituting a lock out for the reëngaging mechanism.

Returning now to the principal feature of the invention, to-wit, the timing mechanism. Supported in bearings on the frame is a shaft 72 connected through gear 73 and intermeshing gear 47× to the driving member 1 and through worm gearing 74 to a running shaft 75 so that the latter will rotate in unison with the driving member but at a lower rate of speed. The lower end of shaft 75 is journaled in the frame and its upper or reduced portion extends through a sleeve or hollow shaft 76 journaled in a bearing 77. This bearing 77 is adjustable on the frame and is held in position by a suitable detachable clamping device such as an eccentric or cam shaped lever 78 mounted upon the frame and engaging the periphery of the bearing. Connected at opposite ends to sleeve 76 and bearing 77, respectively, is a spring 79 the latter tending to turn sleeve 76 in a direction to advance an arm 80 on said sleeve into contact with a stop 81 on bearing 77. Motion is transmitted from shaft 75 to sleeve 76 through a clutch, preferably similar to the described primary and secondary clutches, that is to say, the shaft is equipped with a head 82, fast thereon, the sleeve is provided with an annular bearing or sleeve 83 and in the annular space between the hub of head 82 and said annular bearing or sleeve is arranged an independently movable sleeve 84 with clutching rollers 85. A spring 86 interposed between an arm 87 on sleeve 82 and an arm 88 on sleeve 84 serves to advance the latter, to close the clutch, while an arm or projection 89 on sleeve 84 engaging the walls of diagonal slot 90 in a casing 91 serves to throw the sleeve 84 to unclutching position. Casing 91 is supported to move longitudinally upon shaft 75 and is held from rotation thereon by suitable means such as the arm 87 extending through a longitudinal slot in said casing. The elevation of casing 91 permits the clutch to close thus transmitting the motion of shaft 75 to sleeve 76 in opposition to spring 79, and when said casing is retracted, i. e., lowered, it opens the clutch, to release sleeve 76, and the latter is returned to initial position by its spring 79, said initial position being determined and adjusted by the setting of the stop 81 against which arm 80 contacts. Means are thus provided for varying the starting point of the sleeve 76 when coupled with its driving shaft 75. The upper end of sleeve 76 is formed or provided with gear teeth 92 and on the end of shaft 75, beyond said sleeve, is mounted a second sleeve 93 also provided with gear teeth 94 adjacent those on sleeve 76.

Supported to turn about an axis concentric with sleeves 76 and 93, as by engaging cylindrical portions of said sleeves is a head or frame 95 carrying one or more, preferably two, intermeshing planetary gears 96 and 97 of which 96 gears with the teeth on sleeve 76 while 97 gears with those on sleeve 93, the whole constituting an epicyclic train. The arrangement is such that if head 95 is held stationary motion in the opposite direction will be transmitted from sleeve 76 to sleeve 93, and by shifting head 95 in either direction the relative positions of said sleeves can be varied.

The clutch operating casing 91 is provided with a groove 98 to receive a shifting lever 99, the latter fast on a shaft 100 and provided on one side with a shoulder 101 adapted to be engaged by complemental shoulder 102 carried by a lever 103, when the shifting lever 99 is moved to close the clutch. Lever 103 is provided with a retracting spring 103$^x$ and when said lever is retracted to release lever 99 the latter in falling is arrested before its lug containing shoulder 101 passes beyond the lug containing shoulder 102 so that upon the return of lever 103 the faces of the two lugs will contact in a manner to permit reëngagement of the shoulders when lever 99 is again elevated. A detent mechanism is thus provided for holding and maintaining the timing clutch closed when thrown to that position, and the release of lever 99, to open said clutch, is effected by an admeasuring arm 104 carried by sleeve 93 and contacting with the upper or free end of lever 103 to effect the withdrawal of shoulder 102. The special function of this mechanism is to measure the interval between successive releases of lever 99. Assuming head 95 to be locked or held in any given position and lever 99 lowered to open the timing clutch, sleeve 76 will be retracted by its spring to the position indicated by stop 81 thereby locating admeasuring arm 104 in a predetermined relation to trip lever 103. If, now, shifting lever 99 is elevated to engage tripping lever 103 and close the timing clutch, arm 104 will advance at a speed proportionate to that of the main driving member with which it is geared until it contacts with and displaces tripping lever 103 sufficiently to release lever 99, permitting the latter to fall, and, in so doing, to open the timing clutch and restore arm 104 to initial position.

In so far as the initial timing effected by stop 81 is concerned the arm 104 might be attached directly to sleeve 76 instead of sleeve 93, but by the addition of said sleeve and pinion-carrying head 95 another means for varying the timing is provided, one which can be conveniently utilized for automatically varying the timing to correspond with the adjustments of the mold cavity.

In order to transmit motion from sleeve 76 to sleeve 93 head 95 must be held; otherwise, when sleeve 93 is arrested by the contact of its arm 104 with lever 103 the motion of sleeve 76 will be transmitted to said head, sleeve 93 remaining stationary and its arm exerting only enough pressure to overcome the friction of head 95. If, however, head 95 is arrested at any point in its movement, the pressure upon arm 104 will increase until either lever 103 or the means restraining head 95 yields. So, too, by shifting head 95 upon its axis of rotation the position of arm 104 relative to lever 103 can be adjusted to vary the position of said arm with relation to lever 103, and thus an additional means is afforded for varying the initial timing, suitable retaining devices being applied to lock head 95 in adjusted position.

In the preferred form of embodiment illustrated head 95 is equipped with teeth 105 meshing with a toothed segment 106 fast on shaft 107. Coupled with the mold adjusting devices as by being secured to the mold adjusting rod 122, is an arm or abutment 108, and upon the frame is mounted a lever 109, one arm whereof lies in the path of said abutment or gaging member 108, while the other is coupled by a link 110 with an arm 111 fast on shaft 107. Conveniently, a spring 112 connects lever 109 and arm 111, to retain said lever and head 95 in retracted position. As thus arranged when sleeve 76 is rotated its motion is transmitted to arm 104 until the latter contacts with lever 103, head 95 being retained in position by the pressure of spring 112. The tension of the spring 103$^x$ operating to retain lever 103 in locking position being superior to spring 112 acting upon head 95, arm 104 with its sleeve 93 are arrested and the further motion of sleeve 76 is transmitted to lever 109 through head 95, causing said lever to approach and make contact with gaging member 108. In the meantime this gaging member 108 has received its adjustment as, for example, through mold adjusting rod 122 and is firmly secured in position, consequently, when engaged by lever 109, further movement of head 95 is prevented, and the continued rotation of sleeve 76 will increase the pressure of arm 104 until lever 103 is displaced, thereby terminating the excursion of sleeve 76 by opening the clutch connecting it with its driving shaft 75.

Obviously, other and different means may be applied and will readily be suggested to the skilled mechanic both for adjusting or setting, and for gaging the excursions of, the movable member of the epicyclic gearing to vary the timing of the mechanism, the arrangement illustrated representing a convenient form adapted to a particular type of machine for effecting automatic control of the timing by the mold adjusting devices.

It remains to be seen how timing the release of shifting lever 99 affects the driven in its relation to the driving member. Mounted upon shaft 100 and adjustably connected with lever 99 is an arm 115 provided with a roller 116. This roller stands in the path traversed by the rear end of locking bolt 63 carried by head 4 of the driven member, so that when collar 58 is retracted to withdraw said bolt from in front of arm 6 and close the primary clutch bolt 63 will be in position to engage said arm 115 and tilt lever 99 against the pressure of its retracting spring 117, thus closing the clutch of the timing devices and engaging locking lever 103. Loosely supported upon shaft 100 is a stop arm 118 adapted to be interposed in the path of arm 56 of the clutch operating sleeve 41 to open the secondary clutch for arresting the motion of cam 45. This stop arm 118 carries a pivoted latch 119 whose end is notched as at 120 to engage a pin 121 carried by lever 99. The latch 119 lies in the path of cam 45 and it is recessed on one side for the passage of pin 121. A spring 123 is connected to latch 119 to retain the latter in contact with pin 121, said spring also operating to advance stop arm 118 into the path of clutch arm 56. The opposite end of said spring 123 is attached to a lever 124 pivoted on the frame and engaging the hub of cam 45 to restrain back motion.

Assuming the timing mechanism to have been properly set or adjusted to produce the desired period of dwell, and that the cycle of operations begins during said period when the parts occupy the relative positions seen in Fig. 5. At this stage the timing clutch is closed; lever 99 is sustained in closing position by latching lever 103; the secondary clutch is held open by locking arm 118 whose latch 119 is engaged by pin 121; and the primary clutch is held open by stop 12, the latter suspended from the stationary cam 45 at a point immediately in advance of the raising section of said cam. The driven member is at rest, the driving member and timing mechanism are in motion and arm 104 is approaching lever 103. The moment lever 103 is displaced lever 99 drops under the action of its spring, thereby opening the timing clutch and permitting arm 104 to return to its initial position. At the same time stop arm 118 is withdrawn and the secondary clutch closes connecting cam 45 with its continuously revolving driving shaft. Cam 45 now makes one complete revolution, first raising and then lowering stop 12 and latch 17, then displacing latch 119 and allowing stop arm 118 to return into the path of arm 56 of the secondary clutch which it engages at the completion of one revolution, thereby opening the secondary clutch and arresting cam 45. While stop 12 and latch 17 were in retracted position the primary clutch closed and the driven member started in motion, carrying arm 6 beyond stop 12 by the time the latter returned to its tripping position ready to engage and open the primary clutch at the completion of one revolution.

During the revolution of the driven member and at a predetermined point therein bolt 63 engages lever 115 to raise lever 99, whereupon pin 121 is reëngaged with latch 119, the timing clutch is closed, and latching lever 103 reëngaged, thus completing the cycle. The dwell which takes place between successive revolutions of the driven member (370) corresponds with the interval between the closing of the timing and primary clutches measured in terms of the speed of the driving member, and by varying, in the manner explained, the excursions of arm 104, the duration of the dwell can be varied to suit the necessities of the case. As applied to the type machine the timing mechanism operates immediately the cast is made to afford a longer or shorter interval for the setting of the metal before it is ejected from the mold.

The mechanism is readily adapted for continuous transmission, when no dwell is desired or required, either by uncoupling and removing or retaining stop 12 and latch 17 in elevated position, or by setting forward the timing devices so that the release of lever 99 will be effected just before arm 6 of the primary clutch arrives opposite stop 12, thereby causing the latter together with latch 17 to be withdrawn from in front of arm 6 and engaging shoulder 18, respectively, during the passage of the latter. It is to meet this last named condition that collar 58 is provided with lug 62 and sleeve 49 with complemental off-set or arm 55, in order that when collar 58 is advanced to lock the primary clutch in its open position as hereinbefore explained stop 12 and latch 17 will be withdrawn to free the driven mechanism and permit the latter to be turned in either direction. It will be remembered that when the primary clutch is closed in driving position, bolt 63 prevents the advance of collar 58 until after sleeve 5 has been turned back to open the clutch, and when the timing devices are set ahead, for continuous driving, stop 12 is withdrawn from the path of arm 6 during its passage, to effect which stop arm 118 has been withdrawn from the path of the arm 56 of the secondary clutch opening device and cam 45 is in motion upholding stop 12. If at this period collar 58 is advancing, under the pressure of its motor spring, lug 62 will be arrested in the path of arm 55 and will prevent the secondary clutch from closing until after the primary clutch shall have been opened, it being borne in mind that the secondary clutch has been opened by stop 118 after the passing of arm 6 beyond stop 12, and that the latter is in position to open the primary clutch. The obstruction to bolt 63 being thereby withdrawn the latter, together with collar 58, again advances thus locking the primary clutch in open position and withdrawing lug 62 from in front of arm 55 of the secondary clutch opening device, whereupon said secondary clutch closes automatically and cam 45 being thus set in motion elevates stop 12 until its lever 44 passes above and is engaged by pin 60 as before explained.

As hereinbefore stated, the means described for actuating stop 12, including cam 45, shaft 46, the secondary clutch, stop arm 118, latch 119 and pin 121 are auxiliary to the release of the driven member so that it can be turned in either direction when the primary clutch is opened through the agency of the normal unclutching devices and are not otherwise essential to the action of the timing mechanism.

In so far as the action of the timing mechanism alone is concerned it will suffice if lever 99 is furnished with an arm 133 engaging stop 12, as shown in Fig. 30, so that when the timing clutch opens at the end of the traverse of arm 104, the stop 12 will be withdrawn, to close the primary clutch, and when, during the revolution of the driven member, the timing clutch is closed and locked, as through the action of bolt 63 or equivalent means coupled with the driven member and acting on arm 115 stop 12 will be again advanced and held in the path of arm 6 to open the primary clutch in advance of the opening of the timing clutch.

The feature of automatically controlling the timing mechanism through the agency of the mold adjusting devices is not claimed herein, the same forming the subject of Patent No. 962,408, dated June 28, 1910, based upon a prior application whereof this is a division.

Having thus described our invention, what we claim and desire to secure by Letters Patent of the United States is—

1. A driving or power transmitting mechanism provided with driving and driven members and an interposed clutching member and in combination therewith the following elements, to-wit; a timing mechanism coupled with the driving member through a clutch and provided with an admeasuring member; means controlled by the driven member for closing the timing clutch provided with retaining devices acted upon by said admeasuring member for opening said timing clutch; and means coupled with the timing clutch closing means for alternately opening and closing the first named clutch.

2. A driving or transmission mechanism including in combination the following elements, to-wit; driving and driven members and an intermediate self-closing clutch; a movable stop for engaging said clutch to open the latter; a timing mechanism coupled with the driving member through a clutch; and actuating devices coupled with the driven member and said timing clutch and stop for opening the first named clutch and closing the timing clutch.

3. A driving or transmission mechanism including in combination the following elements, to-wit; driving and driven members and an interposed self-closing clutch; a movable stop for engaging said clutch to open the latter; a timing mechanism coupled with the driving member through a clutch and provided with an admeasuring member; and actuating devices for said stop and timing clutch provided with latching or detent means uncoupling member whereof is located in the path traversed by the admeasuring member of the timing mechanism.

4. A driving or transmission mechanism provided with driving and driven members, an intermediate clutch, and means for actuating the latter to alternately connect and disconnect said members, and in combination therewith, the following elements, to wit; a timing mechanism coupled with the driving member through a clutch and provided with an admeasuring member; actuating devices controlled by the driven member for closing the timing clutch; a latch for retaining said actuating devices in closed position provided with a releasing member opposed to and acted upon by the admeasuring member of the timing mechanism; and means coupling the actuating devices of the timing clutch with the actuating devices of the first named or driving clutch to effect the closing of the latter and the opening of the timing clutch.

5. In a driving or power transmitting mechanism for type machines, the combination of the following elements, to-wit; a driving member; a driven member; a self-closing clutch connecting said driving and driven members; a clutch opening stop mounted upon a reciprocatory support and movable thereon to engage the clutch; a member coupled and moving in unison with the driven member and provided with an engaging shoulder; a latch carried by the stop support and movable thereon to engage said shoulder; connections between said stop and latch to effect simultaneous movements thereof; and a cushioning mechanism or device coupled with the support for said stop and latch.

6. In a driving mechanism for type machines, the combination of the following elements, to-with; driving and driven members and a connecting clutch; a movable stop for engaging said clutch to open the latter; a member coupled and moving in unison with the driven member provided with an arresting shoulder; a latch for engaging said shoulder coupled to move said stop and carried by a movable support; and a hydraulic check provided with a one way restricted movable member, the latter coupled with the movable support for the latch.

7. In a driving mechanism for type and other machines the combination of the following elements, to-wit; a driving member; a driven member, a primary clutch connecting said driving and driven members and provided with an engaging arm for disconnecting said members; a stop supported to move into and out of the path of said engaging arm; and actuating devices for said stop including means for shifting said stop, a secondary clutch, a driving shaft, and means controlled by the driven member for opening and closing said secondary clutch, to control the presentation of the stop to primary clutch.

8. In a driving mechanism for type and other machines provided with driving and driven members and a primary clutch for coupling said members equipped with an actuating arm and in combination therewith the following elements, to-wit; a stop movable into the path of said actuating arm; a cam and intermediate connections for positioning said stop; a driving shaft for the cam; a secondary clutch, intermediate the cam and its driving shaft, provided with an actuating arm; a stop movable into the path of the actuating arm of said secondary clutch, to open the latter and arrest the cam; and means coupled with the driven member for controlling the stop for the secondary clutch.

9. A driving mechanism for type and like machines including driving and driven members, a self-closing clutch provided with an actuating arm, and a movable stop for engaging said arm to open the clutch and disconnect the driven from the driving member, and in combination therewith a controllable actuating mechanism for said stop including the following elements, to-wit; a shaft coupled with said driving member; a cam coupled with said movable stop for controlling the position of the latter; a self-closing clutch provided with an actuating arm and located intermediate said cam and shaft; and means for engaging said last named actuating arm to open the clutch and arrest the cam.

10. In a driving mechanism for type machines and the like containing driving and driven members and an interposed one-revolution clutch provided with an opening stop and in combination therewith a controllable actuating mechanism for said stop including the following elements, to-wit; a cam coupled with the stop for positioning the latter; a shaft geared to the driving member; a self-closing clutch connecting said driving shaft and cam and provided with an actuating arm; a movable stop for said last named clutch actuating arm normally in the path of the latter; and means for temporarily withdrawing said last named stop from the path of its clutch actuating arm, including a member acted upon by the cam to permit the return of said stop before a complete revolution of the clutch takes place.

11. A driving mechanism provided with driving and driven members, an interposed self-closing clutch equipped with an actuating arm or member for opening the clutch, and a stop movable into the path of said actuating arm, and in combination therewith an actuating mechanism for said stop including the following elements, to-wit; a driving shaft coupled to rotate in unison with the driving member; a cam coupled with the stop; a self closing clutch interposed between said driving shaft and cam and provided with an actuating arm; a stop lying normally in the path of said last named clutch arm and provided with a latch; and a reciprocatory member acted upon by the driven member and engaging said latch to withdraw the stop, the latch being in turn acted upon by the cam to permit the return of the stop before the clutch has completed a revolution.

12. In a driving mechanism such as described, the combination of the following elements, to-wit; a driving member; a driven member; a self-closing clutch interposed between said driving and driven members and provided with an actuating arm for opening the clutch; a stop for said clutch actuating arm movable into and out of the path of the latter; a driving shaft in gear with the driving member; a cam controlling the position of said stop, a self-closing clutch intermediate said driving shaft and cam provided with an actuating arm for opening said clutch; a stop for said last named clutch actuating arm provided with a latch in the path of the cam; a lever engaging said latch to withdraw the stop; and means for actuating said lever.

13. In a driving mechanism for type and similar machines the combination of the following elements, to-wit; a driving member; a driven member; a self-closing clutch interposed between said driving and driven members and provided with an actuating arm or member for opening the clutch; and automatic means for engaging said clutch actuating arm or member, including a stop, a cam, a driving shaft, a secondary self-closing clutch, a stop for opening the latter, and a timing mechanism controlling said last named stop.

14. In a driving mechanism for type and similar machines, the combination of the following elements, to-wit; a driving member; a driven member; a self-closing clutch connecting said members and provided with actuating means for opening said clutch; a movable stop interposed in the path of said clutch actuating means; means for automatically shifting said stop; and automatic controlling devices for said shifting means including a timing mechanism, means coupled with the driven member for starting said timing mechanism, and means under the control of the timing mechanism for starting said automatic stop shifting means, to effect the withdrawal of the stop.

15. In a driving mechanism for type and similar machines, the combination of the following elements, to-wit; a driving member; a driven member; a self-closing clutch connecting said members and provided with an actuating arm for opening the same; a stop normally in the path of said actuating arm but removable therefrom; means for automatically shifting said stop to permit the clutch to close and subsequently returning the stop to normal engaging position; a timing mechanism coupled with and controlling said automatic stop shifting means; and means for inaugurating the movement of said timing mechanism from the driven member, the same including a detent and admeasuring devices for releasing said detent.

16. In a driving mechanism, the combination of the following elements, to-wit; driving and driven members and a self-closing clutch carrying an opening arm; a movable stop for engaging said arm; actuating devices for said stop, including a driving shaft, a cam and controllable coupling means for connecting and disconnecting said shaft and cam; and means for locking said clutch in open position with the stop removed from the path of the clutch opening arm.

17. In a driving mechanism, the combination of the following elements, to-wit; driving and driven members and a one revolution clutch provided with a movable engaging stop; actuating devices for said stop including a constantly running driving shaft, a one revolution clutch and means for reciprocating said stop; and means for retaining the first named clutch in the open position to which it is thrown by its stop and subsequently locking the latter in retracted position, to prevent interference with the free rotation of the driven member.

18. In a driving mechanism, the combination of the following elements, to-wit; driving and driven members and a one revolution clutch provided with a movable stop, controllable means for automatically reciprocating said stop, including a constantly running shaft and a one revolution clutch; and controllable means for locking the first named clutch in the open position resulting from the engagement with the stop and subsequently intercepting the return of the stop to engaging position.

19. In a driving mechanism, the combination of the following elements, to-wit; primary driving devices including driving and driven members and a one revolution clutch, the latter provided with an operating member and a stop therefor; actuating devices for the stop of said clutch including a running shaft, a one revolution clutch, and a cam; a timing mechanism coupled with the stop of the last named clutch; and controllable means for locking the first named clutch in open position and its stop in retracted position.

20. In a driving mechanism, the combination of the following elements, to-wit; primary driving devices including driving and driven members and an intermediate one revolution clutch provided with a movable stop; actuating devices for the movable stop of said clutch, including a running shaft, a one revolution clutch and a cam, the latter coupled with said stop; and means for locking the first named clutch in open position and retaining its stop in retracted position, including a reciprocatory member engaging a bolt carried by the clutch in position to pass in front of a shoulder on the operating section when turned to open position, said reciprocating member also carrying a spring bolt adapted to pass and interlock with a shoulder on a part moving with the stop of the first named clutch when said stop is retracted.

21. In a driving mechanism, the combination of the following elements, to-wit; a one revolution clutch comprising an annular bearing or sleeve fixed to the driving member, a hub fixed to the driven member or cylindrical head and interposed gripping rolls and a movable sleeve, the latter provided with an actuating arm; a movable stop for said actuating arm; controllable actuating devices for said stop, including a running shaft; a one revolution clutch, a cam and a lever coupled with said stop; and means for locking the first named clutch in open position and the stop in retracted position, the same including a locking bolt carried by the driven member, a shifter engaging said locking bolt to reciprocate the latter, and a spring pin carried by said shifter in position to intercept the stop actuating lever in retracted position, the arrangement being such that the shifter is prevented from advancing until the sleeve of the first named clutch is engaged by the stop to open said clutch, the spring pin being retracted by contact with the stop lever and interlocking with the latter after the withdrawal of the stop.

22. In a driving mechanism such as described, the combination of the following elements, to wit; driving and driven members and an interposed one revolution clutch provided with an operating member; a latch or bolt carried by the driven member in position to engage and hold the operating member of the clutch in open position; means for shifting said latch or bolt; and a lockout for said shifting means controlled by the driven member.

23. In a driving mechanism such as described the combination of the following elements, to wit; driving and driven members and an intermediate one revolution clutch provided with an operating member; a latch carried by the driven member for engaging the operating member of the clutch to lock the latter open; means coupled with said latch for shifting the latter; and a lockout for said shifting means, including a pawl carried by the latter and an obstructing member moving in unison with the driven member and provided with a gap for the passage of said pawl.

24. In a driving mechanism for type casting machines and the like provided with controllable means for effecting the uncoupling of the driving member and in combination therewith the following elements, to wit; driving and driven members and an interposed one revolution clutch; a latch for engaging the operating member of the clutch to retain the latter in open position; means for shifting said latch provided with a pawl; and a lockout flange carried by the driven member provided with a gap or opening, said flange permitting the passage of the pawl in one direction at any position of the driven member but restricting its passage in the opposite direction to a position corresponding with the gap or interval in the flange.

25. In a driving mechanism, the combination of the following elements, to-wit; driving and driven members and an interposed one revolution clutch provided with an opening stop member; a means for actuating said stop, including a running shaft, driving devices for reciprocating the first named clutch stop, and a single revolution clutch provided with a stop and an opening member equipped with a plurality of arms in different planes; a latch adapted to restrain the opening member of the first named clutch; and shifting means for said latch provided with a stop for engaging an arm of the opening member of the second named clutch.

26. In a driving mechanism, the combination of the following elements, to-wit; driving and driven members and a one revolution clutch, the latter provided with an opening member and a stop therefor; actuating means for said stop including driving devices coupled with the stop, a running shaft and a one revolution clutch; the latter provided with an opening member and a stop therefor, a movable member coupled with the stop of the second named clutch through a releasing latch; a bolt carried by the driven member and operating to retain the opening member of the first named clutch in open position; means for reciprocating said bolt; and means for effecting the engagement of the movable member with the stop of the second named clutch, said means being adapted to connect with said bolt when withdrawn but to escape the latter when it is advanced to retain the opening member of the clutch.

27. In a driving mechanism, the combination of the following elements, to-wit; a driving member; a driven member; a self-closing one revolution clutch connecting said driving and driven members and provided with a clutch opening stop; a timing mechanism provided with an admeasuring member; a running shaft; a clutch and means for locking the latter in closed position; means disposed in the path of the admeasuring member and operating on the locking devices to open the timing clutch; and connections between the actuating devices of the timing clutch and the opening stop for the first named clutch for effecting the withdrawal of the stop and closing of the first clutch upon the opening of the timing clutch and the presentation of said stop in the path of the first clutch upon the closing of the timing clutch.

28. In a timing mechanism for driving mechanisms such as described, the combination of the following elements, to-wit; a running shaft; a driven shaft; a clutch interposed between said shafts; actuating devices for the clutch; a latch for said actuating devices; an admeasuring member coupled with and deriving its motion from said driven shaft and operating at the completion of its excursion to withdraw the latch and release the clutch actuating devices; an adjustable stop or gage for the admeasuring member; and means for retracting said admeasuring member upon the opening of the clutch.

29. In a timing mechanism for driving mechanisms such as described, the combination of the following elements, to-wit; a running shaft; a driven shaft; a clutch connecting said shafts and provided with actuating means for opening and closing said clutch; an admeasuring member deriving motion from the driven shaft; a latch for retaining the clutch actuating means in closed position; a latch-opening member disposed in the path traversed by said admeasuring member; a retracting spring for the admeasuring member; and an adjustable stop or gage for varying the relative positions of the admeasuring and latch-opening members and thereby determining the interval between the closing and opening of the clutch.

30. In a timing mechanism for driving mechanism such as described, the combination of the following elements, to-wit; a running shaft; a driven shaft; a clutch interposed between said shafts and provided with actuating devices; a latch for retaining said actuating devices in closed position; an admeasuring arm for releasing said actuating devices, to open the clutch; and an epicyclic train provided with a shiftable transmission member interposed between said driven shaft and admeasuring arm and provided with means for shifting the axis of the transmission member circumferentially of the central axis to vary the position or excursion of the admeasuring arm.

31. In a timing mechanism for driving mechanism such as described, the combination of the following elements, to-wit; a running shaft; a driven shaft provided with a gear; a clutch interposed between said shafts; actuating devices for said clutch; a latch for said actuating devices; an admeasuring arm controlling said latch; an epicyclic train, including a gear carrying the admeasuring arm and supported to rotate about an axis concentric with that of the driven shaft; a frame or head revoluble about the axis of said driven shaft and carrying one or more transmitting pinions; and means for rotating said head or frame to shift the position of the admeasuring arm.

32. In a timing mechanism for driving mechanism such as described, the combination of the following elements, to-wit; a running shaft; a driven shaft; a clutch intermediate said shafts provided with actuating devices and a retaining latch; an epicyclic train including a central pinion on the driven shaft, a head or frame revoluble about the axis of said driven shaft and carrying one or more transmission pinions; and a gear mounted on an axis concentric with that of said driven shaft; an admeasuring arm fast on said last named gear in position to engage the latch; and an abutment or gage for limiting the movement of the transmission gear frame or head.

33. In a timing mechanism for driving mechanism such as described, the combination of the following elements, to-wit; a running shaft; a driven shaft; a clutch connecting said shafts and provided with actuating devices; an epicyclic train whereof the central gear is coupled with the driven shaft and the transmission or planetary gears are mounted upon a head or frame revoluble about the axis of said central gear; a gear meshing with a transmission gear and provided with an admeasuring arm; a latch for the clutch actuating devices having an operating member opposed to the admeasuring arm; and means for adjusting the initial position of the admeasuring arm including a stop for the driven shaft, and means for retracting the latter.

34. In a timing mechanism for a driving mechanism such as described, the combination of the following elements, to-wit; a running shaft; a driven shaft; a clutch intermediate said shafts and provided with an actuator and a detent or latch therefor; an epicyclic train whose axial gear is coupled with the driven shaft and the planetary gear with an admeasuring arm opposed to the actuator for the detent or latch; and means coupled with the driven shaft for adjusting the initial position of said shaft, to vary the traverse of the admeasuring arm.

35. In a timing mechanism for a driving mechanism such as described, the combination of the following elements, to-wit; a running shaft; a driven shaft; a clutch intermediate said shafts provided with actuating devices and a detent or latch therefor; an epicyclic train whereof the axial gear is coupled with the driven shaft and the planetary gear with an admeasuring arm opposed to and operating upon the detent or latch, to open the latter; and means for adjusting the position of the support for the planetary gear, to vary the traverse of the admeasuring arm.

JOHN SELLERS BANCROFT.
MAURITZ C. INDAHL.

Witnesses:
MORTIMER A. JONES,
FRED WEINDEL, Jr.